United States Patent
Goesmann

(10) Patent No.: US 9,972,813 B2
(45) Date of Patent: May 15, 2018

(54) ENERGY STORAGE MODULE COMPRISING A PLURALITY OF PRISMATIC STORAGE CELLS AND METHOD FOR PRODUCTION THEREOF

(71) Applicant: Bayerische Motoren Werke Aktiengesellschaft, Munich (DE)

(72) Inventor: Hubertus Goesmann, Nattheim-Auernheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 66 days.

(21) Appl. No.: 14/052,254

(22) Filed: Oct. 11, 2013

(65) Prior Publication Data

US 2014/0038030 A1    Feb. 6, 2014

Related U.S. Application Data

(63) Continuation of application No. PCT/EP2012/001909, filed on May 4, 2012.

(30) Foreign Application Priority Data

May 27, 2011    (DE) .................. 10 2011 076 575

(51) Int. Cl.
*H01M 2/10* (2006.01)
*H01M 10/04* (2006.01)
*B60L 11/18* (2006.01)

(52) U.S. Cl.
CPC ....... *H01M 2/1077* (2013.01); *B60L 11/1864* (2013.01); *B60L 11/1879* (2013.01);
(Continued)

(58) Field of Classification Search
CPC .................................................. H01M 2/1077
(Continued)

(56) References Cited

U.S. PATENT DOCUMENTS 4,100,333 A    7/1978   Haas et al.
5,149,391 A *  9/1992   Li .................... B29C 70/504
                                                    100/153

(Continued)

FOREIGN PATENT DOCUMENTS

CN    101765932 A    6/2010
DE    43 34 282 A1   4/1995
(Continued)

OTHER PUBLICATIONS

Owens Corning Product Information Pub. No. 57948-D, Oct. 2003, 2 pages.*

(Continued)

*Primary Examiner* — Miriam Stagg
*Assistant Examiner* — Victoria H Lynch
(74) *Attorney, Agent, or Firm* — Crowell & Moring LLP

(57) ABSTRACT

The present invention relates to an energy storage module for an apparatus for supplying voltage of a motor vehicle, wherein the energy storage module comprises a plurality of prismatic storage cells which are stacked in at least one row, are arranged one behind the other and are braced between at least two end plates by means of at least one tie rod, wherein at least one of the end plates has a layer structure comprising at least three successive layers, wherein two outer layers surround at least one inner layer, and wherein the inner layer has a wavy and/or diffuse structure.

7 Claims, 2 Drawing Sheets

(52) U.S. Cl.
CPC ..... *H01M 2/1072* (2013.01); *H01M 10/0481* (2013.01); *H01M 2220/20* (2013.01); *Y02T 10/7005* (2013.01); *Y02T 10/7061* (2013.01); *Y10T 29/49108* (2015.01)

(58) Field of Classification Search
USPC ........................................................ 429/157
See application file for complete search history.

(56) References Cited

U.S. PATENT DOCUMENTS

| | | | |
|---|---|---|---|
| 5,756,227 | A | 5/1998 | Suzuki et al. |
| 5,817,434 | A | 10/1998 | Brooker et al. |
| 6,821,671 | B2 | 11/2004 | Hinton et al. |
| 7,572,549 | B2 | 8/2009 | Wegner |
| 8,426,079 | B2 | 4/2013 | Okada |
| 2004/0191472 | A1* | 9/2004 | Adolphs ............... B32B 5/16 428/102 |
| 2005/0058891 | A1 | 3/2005 | Marraffa |
| 2007/0007141 | A1 | 1/2007 | Maeda et al. |
| 2008/0280194 | A1 | 11/2008 | Okada |
| 2009/0214900 | A1 | 8/2009 | Hoffjann et al. |
| 2010/0136405 | A1 | 6/2010 | Johnson et al. |
| 2010/0190049 | A1 | 7/2010 | Kawase et al. |
| 2011/0262785 | A1* | 10/2011 | Johnson ............... H01M 2/1077 429/66 |
| 2012/0282506 | A1 | 11/2012 | Hohenthanner et al. |
| 2012/0288741 | A1 | 11/2012 | Gutsch et al. |
| 2012/0301775 | A1 | 11/2012 | Lachenmeier et al. |

FOREIGN PATENT DOCUMENTS

| | | |
|---|---|---|
| DE | 196 33 095 A1 | 2/1997 |
| DE | 101 23 579 A1 | 11/2002 |
| DE | 10 2005 031 504 A1 | 1/2007 |
| DE | 10 2006 029 511 A1 | 1/2007 |
| DE | 10 2005 051 583 A1 | 5/2007 |
| DE | 10 2006 048 291 A1 | 2/2008 |
| DE | 10 2008 059 964 A1 | 6/2010 |
| DE | 10 2008 059 966 A1 | 6/2010 |
| DE | 10 2009 057 565 A1 | 7/2010 |
| DE | 10 2009 035 482 A1 | 2/2011 |
| DE | 10 2009 028 920 A1 | 3/2011 |
| DE | 10 2009 040 147 A1 | 3/2011 |
| DE | 10 2009 048 250 A1 | 4/2011 |
| EP | 0 264 073 B1 | 4/1988 |
| GB | 1 526 279 A | 9/1978 |
| GB | 2 283 089 A | 4/1995 |
| JP | 2002-042763 A | 2/2002 |
| JP | 2004-235110 A | 8/2004 |
| JP | 2007-294407 A | 11/2007 |
| JP | 2008-124033 A | 5/2008 |
| JP | 2009-26703 A | 2/2009 |
| JP | 2009-048965 A | 3/2009 |
| WO | WO 2006/024421 A2 | 3/2006 |
| WO | WO 2007/117212 A2 | 10/2007 |
| WO | WO 2011/054544 A1 | 5/2011 |

OTHER PUBLICATIONS

International Search Report dated Feb. 18, 2013, with Statement of Relevancy (Nine (9) pages).
German Search Report dated Feb. 10, 2012, with Statement of Relevancy (Five (5) pages).
International Search Report dated Jul. 23, 2012, with Statement of Relevancy (Five (5) pages).
German Search Report dated Jan. 17, 2012, with Statement of Relevancy (Five (5) pages).
International Search Report dated Jul. 8, 2012, with Statement of Relevancy (Five (5) pages).
Chinese Office Action dated Jan. 27, 2015 with English translation (Seventeen (17) pages).
Chinese Office Action dated Jun. 11, 2015, with English translation (Twenty Four (24) pages).
German-language Japanese Office Action issued in counterpart Japanese Application No. 2014-511757 dated Apr. 26, 2016 (7 pages).

* cited by examiner

ENERGY STORAGE MODULE COMPRISING A PLURALITY OF PRISMATIC STORAGE CELLS AND METHOD FOR PRODUCTION THEREOF

CROSS REFERENCE TO RELATED APPLICATIONS

This application is a continuation of PCT International Application No. PCT/EP2012/001909, filed May 4, 2012, which claims priority under 35 U.S.C. § 119 from German Patent Application No. DE 10 2011 076 575.1, filed May 27, 2011, the entire disclosures of which are herein expressly incorporated by reference.

BACKGROUND AND SUMMARY OF THE INVENTION

The invention relates to an energy storage module for a device for supplying voltage, particularly of a motor vehicle, comprising a plurality of prismatic storage cells which, stacked in at least one row, are arranged behind one another and braced between at least two end plates by way of at least one tension element, particularly by means of at least one tie rod. The invention further relates to a method of producing an energy storage module as well as to a method of producing an end plate for an energy storage module.

In a device for supplying voltage to a motor vehicle usually called a battery, a plurality of energy storage modules is mostly used for the drive of the vehicle, for example, of electric vehicles or hybrid vehicles. A respective energy storage module typically consists of several stacked prismatic storage cells. The individual storage cells contain electrochemical cells of the battery. The stack of individual storage cells is usually mechanically braced by means of an end plate (also pressure plate) and tie rods to form the energy storage module. In addition to mechanically fixing the modules with respect to one another, the end plates and tie rods especially have the purpose of counteracting a deformation by the change or increase of the internal gas pressure during the operation of the electrochemical cells of the storage module arranged in the interior of the modules.

The end plates and tie rods of the conventional energy storage modules are usually produced by means of the extrusion process from steel or aluminum. The production of such so-called extruded sections is connected in this case with high production-related expenditure and the resulting high costs. Extruded sections for energy storage modules can therefore not be cost-effectively produced on a large scale. Conventional extruded sections for energy storage modules further have the disadvantage that they are heavy because of the material properties of the used material, which has a disadvantageous effect on the total weight of the motor vehicle. Furthermore, the materials forming the extruded section, thus, as a rule, steel or aluminum, are electrically conductive, so that an insulating layer is required between the individual storage cells and the tensioning device, in order to prevent electric couplings between the storage cells. The providing of such insulating layers is costly and increases the manufacturing expenditures of the energy storage module and thereby the costs for its production.

It is an object of the present invention to provide a cost-effective stable energy storage module for a device for supplying voltage, which can be produced in a simple manner and has a low net weight. It is a further object to provide an energy storage module that is constructed for counteracting deformations occurring as a result of pressure changes during the operation of the storage cells. It is a further object of the present invention to provide a method of producing an energy storage module and of an efficient end plate for an energy storage module that requires low production-related expenditures and, in addition, permits a simple and cost-effective manufacturing of the energy storage module.

The object is achieved by means of the combinations of characteristics of the independent claims. The dependent claims indicate advantageous embodiments of the invention.

The object is therefore achieved by an energy storage module for a device for supplying voltage, particularly of a motor vehicle, comprising a plurality of prismatic storage cells which, stacked in at least one row, are arranged behind one another and braced between at least two end plates by means of at least one tension element, particularly by way of at least one tie rod, at least one of the endplates having a layer structure of at least three successive layers, in which case two outer layers surround at least one inner layer and the inner layer has a wavy and/or diffuse structure. Normally, one end plate respectively is mounted in an energy storage module on the respective front face of the stacked cells disposed at the end, so that the energy storage module comprises two end plates. However, an end plate may also consist of several individual plates, in which case then, according to the invention, at least one of these individual plates has a layer structure of at least three layers, two outer layers surrounding an inner layer and the inner layer having a wavy and/or diffuse structure. All end plates preferably have a layer structure of at least these three specific layers. The effect achieved according to the invention is therefore maximized.

The end plate of the energy storage module according to the invention has a layer structure. This layer structure comprises at least three layers, whereby a sufficient stability of the end plate is ensured with respect to a compression deformation. Additional layers may be provided. The layers may be formed of different materials which comprise metals or alloys, such as steel and also synthetic materials, in which case the respective layers may all or partly be made of the same material or in each case of different materials. Suitable materials can be combined with one another.

The layer structure of the energy storage module according to the invention is characterized in that it consists of at least three successive layers, two outer layers surrounding at least one inner layer and the inner layer having a wavy and/or diffuse structure. A wavy and/or diffuse structure in accordance with the invention is a structure which at least partly has unevennesses, bulges or curves and is therefore significantly different from the planar outer layers. In the simplest case, a wavy structure is a uniform wave structure, such as a sine wave with a correspondingly shaped amplitude. However, the wave-type structure may also incorporate linear and/or curved regions and, for example, also a trapezoidal structure.

A diffuse structure in accordance with the invention is one in which the material forming the diffuse structure has essentially irregularly shaped or non-uniformly shaped or arranged regions. Diffuse regions occur, for example, by an anisotropic distribution of the material forming the inner layer, as, for example, in the case of fiber-type materials. Diffuse structures are also provided by using foamed materials. Foamed materials are those materials which form a structure as a result of the entering or generating, of, for example, a gas, such as air, nitrogen, $CO_2$, foaming agents or the like, in which structure the gaseous bubbles are surrounded by firm walls made of the foamed material.

As a rule, the outer layers are planar layers which, however, also have a certain inherent structure, thus, for example, unevennesses of the surface, caused by the structure of the used material or even mounted surface structures advantageously pointing to the inner layer. The stability of the end plate is thereby increased.

In a different arrangement, an inner layer of a wave-type and/or diffuse structure can be inserted between the outer layers. For example, an inner layer having a wave-type structure may be inserted between two outer layers such that the inner layer is in contact with the outer layers only by way of the points or areas bulging or curved toward the respective side. The inner layer therefore also has regions or points that are not in contact with one of the outer layers. Particularly in the case of several provided inner layers, those having a wavy structure can, however, also be inserted between two outer layers such that the wavy inner layers are arranged with the course of their wave orthogonally with respect to the outer layers. Thus, the inner wavy layers are in contact with the outer layers only by way of two regions, specifically one edge of the inner layer, for example, the region of the start of the wave, and the opposite edge of the inner layer, for example, the region of the end of the wave. The arrangement of diffuse layers can take place in an arbitrary manner because of the essentially random structure, and therefore in a suitable manner.

As a result of the construction of the inner layer of the end plate with a wavy and/or diffuse structure, the latter, and therefore the entire end plate, is particularly well suited for counteracting the deformations occurring in the interior of the energy storage module because of pressure changes during the operation of the storage cells. In other words, the end plates absorb the deformation energy of the storage cells and distribute it evenly over the entire surface of the end plate, so that the exterior wall of the energy storage module experiences almost no spatial change because of the uniform loading as a result of the effect of the deformation energy, and therefore essentially no deformation of the entire energy storage module takes place. Because of its structure, particularly the inner layer is provided for absorbing deformation energies, in which case, in addition, particularly the outer layers have high mechanical resistance and thereby also counteract the deformation of the energy storage module. An end plate comprising such a layer structure, compared to conventional extruded sections, has the advantage that the stability of these end plates can be adjusted in a targeted manner corresponding to the demands. Furthermore, an effective weight reduction of the net weight of the end plate and thereby of the energy storage module is achieved. The manufacturing expenditures of such an end plate are also low, which not only lowers the technical and economics-related demands on the production of the energy storage module according to the invention but also its manufacturing costs and thus the costs of the energy storage module.

The end plates of the energy storage module according to the invention are braced by way of at least one tension element, particularly by way of at least one tie rod. The number and shape of the tension elements or tie rods depends on their individual design. Depending on the required stability, one tie rod or, for example, several tension elements/tie rods may be provided which connect (brace) the end plates to one another which are mounted on the face side on the exterior storage cells. In this case, such tie rods may be made of metal, for example, of steel or aluminum, and have a shape that permits a permanent connection and bracing of the storage cell module comprising storage cells and end plates.

Conventional further components, such as electric connections and insulators between the cells and/or the storage cells and the bracing element, can complete the energy storage module according to the invention.

In an advantageous embodiment, it is provided that the layers of the energy storage module according to the invention consist of metal, particularly of aluminum or steel and particularly of aluminum, the inner layer having a wave-type structure. End plates, which consist of metallic layers, are distinguished by excellent stability, which, because of their material properties and particularly their high mechanical resistance, effectively counteract a deformation of the storage cells and thereby of the energy storage module. The individual metallic layers can be mutually connected in different suitable fashions. For example, the metal layers, thus particularly metal plates or metal sheets, are welded to one another, for example, by means of laser welding or spot-welding, and/or are screwed to one another and/or are glued to one another. The metal plates are preferably glued to one another, because this represents a very cost-effective and efficient manner of connecting metal plates.

Preferred metals comprise aluminum or steel, steel having particularly high stability, mechanically and also chemically, while aluminum, because of its low weight, is particularly suitable for the use in motor vehicles manufactured as lightweight constructions. Wavy structures can be achieved in the metallic inner layer, for example, by a simple reshaping, such as, bending or upsetting. As an alternative or in addition, the wave-type structure of the inner layer may, however, also be generated by the application of a stamping. Metal plates of a suitable shape and size are also commercially available at reasonable cost, which reduces the production costs and the technical and logistic expenditures of the manufacturing of the energy storage module according to the invention.

In a further advantageous embodiment, it is provided that the outer layers consists of metal, particularly of aluminum or steel and particularly of aluminum, the inner layer having a diffuse structure. Because of its low net weight, aluminum is again preferred as the material of the outer layers. For example, inner layers of a diffuse structure, as mentioned above, are particularly structures made of fibers, such as fiber mats or elastomer particles, which are fixed by means of a suitable matrix material. Such end plates are also suitable for effectively counteracting deformations as a result of pressure changes in the interior of the storage cells and for uniformly absorbing or diverting the deformation energies, so that the formation of local energy maxima, which may also lead to local deformations, is prevented. In comparison to conventional extruded profiles and also in comparison to purely metal-based end plates, such a layer structure is distinguished by a lower net weight. The materials to be used are also easily obtainable and cost-effective. The working of the respective layers for forming an end plate can take place without any high technical expenditures and can be automated to the largest extent, which keeps the production costs of the energy storage module according to the invention low.

The diffuse layer inserted between the two outer metal plates preferably is a foam-type structure, such as metal foam, particularly aluminum foam, polyurethane foam, polyethylene foam, polypropylene foam, polyvinyl chloride foam, polystyrol foam or foamed expanded polypropylene and particularly polyurethane foam. However, generally, all foam-type materials are used which provide the inner layer with sufficient stability. Foam-type materials are not only preferred because the weight of the material to be foamed is usually lower than that of metals but also because of the weight reduction as a result of the foaming agent that was inserted or generated in the material itself that is to be foamed. Therefore the energy storage module according to the invention, whose end plate has a layer structure whose inner layer is a foam-type layer surrounded by two outer metal layers, is distinguished by a low weight and is therefore particularly suitable for motor vehicles of a light-weight construction. In addition, suitable foamable or foamed materials are easily obtainable at reasonable cost and, in addition, can easily be worked without high technical expenditures. In the simplest case, a plate made of already completely foamed and hardened material is only cut to the desired shape and size, is inserted between two provided metal plates and preferably laminated or is glued to the metal plates. In this case, a particularly preferred foam-type material is aluminum foam, because this material is distinguished by excellent mechanical as well as chemical resistance and, in addition, is obtainable at reasonable cost in any degree of hardness and further has a low net weight.

The energy storage module according to the invention is preferably characterized in that the layer structure consists of a fiber composite material which comprises fibers and a polymeric matrix, the inner layer having a diffuse and/or wave-type structure which is generated by pulling the fiber composite material and which is surrounded by two outer layers consisting of unpulled material. In this case, the fiber composite material comprises particularly a thermoplastic matrix with fibers or a duromeric matrix with fibers, and particularly a duromeric matrix with fibers. The fibers in the fiber composite material are fixed and stabilized by the matrix material. Such fiber composite materials are easily available in the desired hardness or elasticity, and are distinguished by low costs and, in addition, by insulating properties, whereby, as a rule, insulation layers between the individual storage cells and between the storage cell and the tie rod will not be necessary, which clearly simplifies the production and thereby also reduces the manufacturing costs. In addition, these materials have a low net weight in comparison to current extruded sections and can easily be worked by means of conventional devices without any high technical expenditures, which keeps the production costs of the energy storage module according to the invention low. Duromeric matrix materials have been particularly successful because of the very good and permanent mechanical and thermal stability. For producing the specific three-layer structure of the end plate, a vacuum is in each case applied to the top side and the bottom side of a fiber material, if required, with the aid of a perforated cover film to be removed later, so that the fiber material is pulled and separates into two cover layers which are mutually connected by fiber webs. The fiber webs, thus the inner layer, are more or less uniformly spaced away from one another and form a diffuse, partly wave-type layer and thus a stable connection between the cover layers which form the outer layers. This structure is fixed by the injection of matrix material during the application of the vacuum. Such a layer structure of a fiber composite material, with an inner layer having a wave-type or partly also diffuse structure, is distinguished by an especially low net weight, so that the weight of the energy storage module according to the invention is effectively lowered. However, such fiber composite materials also provide sufficient stability, so that an end plate formed of such a material is superbly suitable for counteracting a deformation caused by pressure changes in the interior of the storage cells.

The fibers that can be used for the above-described structured composite material are particularly selected from glass fibers, carbon fibers, mineral fibers, such as basalt fibers, plant fibers, as, for example, cellulose fibers or hemp fibers, ceramic fibers, such as mullite fibers or SiC fibers, steel fibers or synthetic fibers, as, for example, polypropylene fibers, nylon fibers or aramid fibers or mixtures thereof. The fibers can be selected depending on the demand profile. Glass fibers are particularly preferred because they are characterized by high stability, good availability and electrically insulating properties. In addition, glass fibers can be obtained at reasonable cost in the necessary stability grades. This lowers the production costs of the energy storage module according to the invention while its stability is very good. The fibers may be present as long fibers or short fibers, long fibers clearly increasing the stability of the fiber composite material. The fiber materials indicated here are all distinguished by very good mechanical stabilities and can easily be worked to form the above-described fiber composite materials.

In a further advantageous embodiment, the energy storage module according to the invention is characterized in that the fibers are present in the form of a woven, a weave or a knit, particularly a knit. Such semi-finished textile products can be split particularly easily by applying a vacuum to their top and bottom side into a three layer structure, comprising two outer essentially planar cover layers and a wave-type and/or diffuse inner layer of fiber webs. The outer layers form a predominantly closed cover layer, while, by pulling the semi-finished textile product under a vacuum, the forming inner layer forms a more or less loose fiber structure of fiber webs connecting the outer cover layers. The fiber webs are distributed more or less uniformly over the entire surface and may have a linear as well as a wave-type shape.

Furthermore, according to the invention, a method of producing an end plate for an energy storage module is provided, wherein the end plate has a layer structure of at least three successive layers, wherein two outer layers surround at least one inner layer, and wherein the inner layer has a wave-type and/or diffuse structure, wherein the method comprises the steps of providing a metal plate, particularly a steel plate or aluminum plate, particularly an aluminum plate, the reshaping of at least one metal plate into a wave-shaped metal plate, the inserting of the wave-type metal plate between two additional metal plates and the connecting of the three metal plates while forming a layer structure. The reshaping of the metal plate may preferably be implemented by bending and/or upsetting and/or stamping the metal plate. The fastening of the metal plates may preferably further be implemented by welding and/or screwing and/or gluing.

According to the invention, a further method is provided for producing an end plate for an energy storage module, wherein the end plate again has a layer structure of at least three successive layers, wherein two outer layers surround at least one inner layer and wherein the inner layer has a wave-type and/or diffuse structure, wherein the method comprises the steps of providing a semi-finished textile product, particularly a fiber woven, a fiber weave or a fiber knit, particularly a fiber knit, wherein the semi-finished textile product contains particularly glass fibers, the placing of a polymeric matrix, particularly a thermoplastic or duromeric matrix, particularly a duromeric matrix into the semi-finished textile product, the applying of a vacuum to both surface sides of the semi-finished textile product, the pulling-into-shape of the semi-finished textile product and, if required, hardening of the end plate. In other words, a vacuum is applied by way of a vacuuming device to the respective top and bottom side of a corresponding semi-finished textile product and the semi-finished textile product is thereby pulled apart. For stabilizing the forming layer, a matrix material, preferably a duromeric material, is preferably already during the application of a vacuum placed in the semi-finished textile product. After the completion of the vacuuming operation, a loose wave-type and/or diffuse layer of fiber webs bridging the cover layers will have formed between the two outer, almost impermeable planar cover layers. This formation is sufficiently stabilized by the matrix material, in which case, depending on the used matrix material, the latter can still be hardened in a conventional manner, for example, by light hardening or temperature hardening.

According to the invention, a further method is provided for producing an end plate for an energy storage module, wherein the end plate has a layer structure of at least three successive layers, wherein two outer layers surround at least one inner layer and wherein the inner layer has a wave-type and/or diffuse structure, wherein the method comprises the steps of placing a foam-type material between two metal plates, particularly between two steel plates or aluminum plates, and particularly between two aluminum plates, and, if required, hardening the foam-type material, particularly an aluminum foam. In other words, the method provides that an already completely foamed and hardened foam-type material cut to the corresponding shape, as, for example, a plate made of polyurethane foam, is placed between two metal plates and is connected, thus, preferably glued to the latter. However, as an alternative, an expandable material may also be placed between two spaced metal plates, which will foam between the metal plates and thereby fill the space between the metal plates. In this case, a hardening step of the foamed material is preferably provided.

The advantageous embodiments described within the scope of the energy storage module according to the invention are correspondingly advantageously applied within the scope of the method according to the invention for producing the end plates for the energy storage module.

By means of this method, an end plate for an energy storage module can be produced in a simple and cost-effective manner without high technical or logistical expenditures. Compared to conventional extruded sections, the end plate is distinguished by a reduced net weight, so that this method is particularly suitable for the production of end plates for energy storage modules for motor vehicles of a lightweight construction. Because of the simple method implementation that can be automated well and is therefore cost-effective, the costs for the energy storage module according to the invention are also low.

Furthermore, according to the invention, a method is provided for producing an energy storage module for a device for supplying voltage, particularly of a motor vehicle, comprising a plurality of prismatic storage cells which, stacked in at least one row, are arranged behind one another, which comprises the steps of providing at least two end plates, wherein at least one end plate has a layer structure of at least three successive layers, wherein two outer layers surround an inner layer and wherein the inner layer has a wave-type or diffuse structure, if required, the providing of fastening elements and/or floor fastening elements on at least one end plate, the mounting of at least one end plate respectively on the respective face side of the storage cells disposed at the end of the prismatic storage cells stacked in a row, and the bracing of the end plates by way of at least one tie rod.

Advantageously, at least one of the end plates is produced by a method as implemented above.

The advantageous embodiments described within the scope of the energy storage module according to the invention are correspondingly advantageously applied within the scope of the method according to the invention for producing the energy storage module.

A method is thereby provided for producing an energy storage module which is easy to implement and variable in its application. The method according to the invention requires only low production-related expenditures and thereby contributes to the lowering of the production costs of the energy storage module and thereby of its overall costs. In addition to a high quality, a mechanical, chemical and physical stability and an efficient operating mode, the energy storage module according to the invention has a lower net weight than energy storage modules comprising extruded sections, whereby the total weight of a motor vehicle containing the energy storage module according to the invention is reduced, so that it is particularly suitable for motor vehicles of a lightweight construction. Because of the reduced production costs, the costs of the energy storage module are also low.

In the following, the invention will be explained in detail by means of the drawing.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, the invention will be explained in detail by means of the figures.

Figure 1:
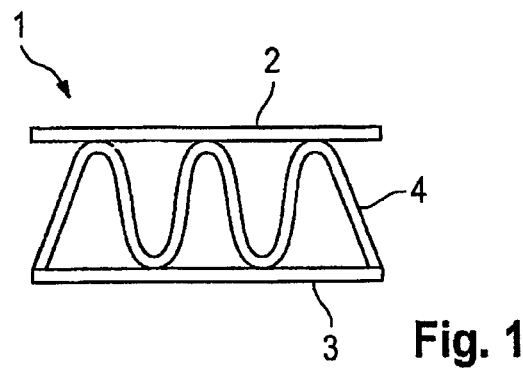
FIG. 1 is a lateral view of an end plate of the energy storage module of the invention according to a first embodiment.

FIG. 1 illustrates an end plate 1 for an energy storage module according to a first embodiment, which has a three-layer structure. The three-layer structure comprises two outer layers 2, 3 and an inner layer 4, the inner layer 4 having a regular uniform wave structure with a constant amplitude. This inner layer 4 is arranged such that, with respect to the course of its waves, it is arranged parallel to the surfaces of the outer layers 2, 3. In this embodiment, the layers 2, 3, 4 consist of metal sheets or metal plates, in which case, the inner layer 4 was shaped into a wave structure by bending such a metal plate. The respective layers 2, 3, 4 are mutually connected by adhesive connections (not shown). This results in an end plate 1 of a stable structure which is extremely suitable for counteracting deformations as a result of pressure changes in the interior of the storage cells of an energy storage module.

Figure 2:
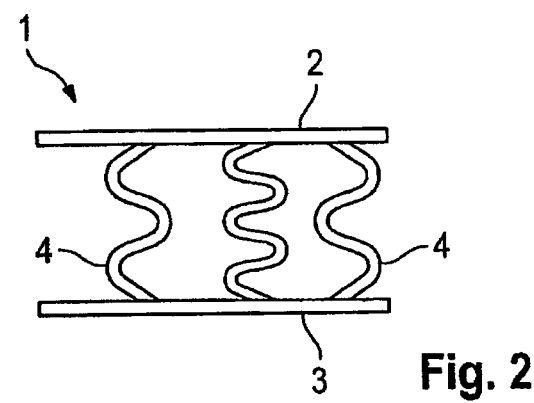
FIG. 2 is a lateral view of an end plate of the energy storage module of the invention according to a second embodiment.

FIG. 2 illustrates an end plate 1 for an energy storage module according to a second embodiment, which also has a three-layer structure. The three-layer structure again comprises two outer layers 2, 3 and three inner layers 4, the inner layers 4 having a regular uniform wave structure with a constant amplitude. In this embodiment, these inner layers 4 are arranged such that they are disposed with respect to the course of their waves orthogonally to the surfaces of the outer layers 2, 3. For the purpose of completeness, it should be noted that the number of the inner layers is not limited and, depending on the demand, may comprise a certain number of layers. In this embodiment, the layers 2, 3, 4 consist of metal sheets or metal plates, in which case, the inner layers 4 were shaped into a wave structure by bending such a metal plate. The respective layers 2, 3, 4 are mutually connected by adhesive connections (not shown). This results in an end plate 1 of a stable structure which is extremely suitable for counteracting deformations as a result of pressure changes in the interior of the storage cells of an energy storage module.

Figure 3:
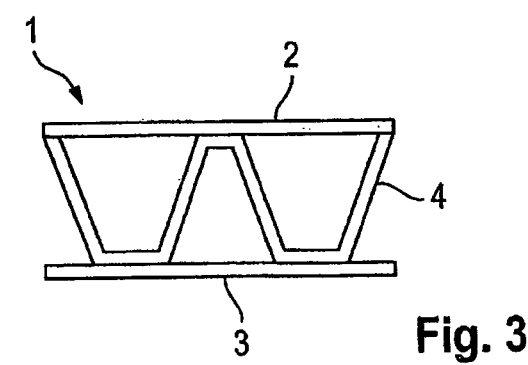
FIG. 3 is a lateral view of an end plate of the energy storage module of the invention according to a third embodiment.

FIG. 3 illustrates an end plate 1 for an energy storage module according to a third embodiment, which has a three-layer structure. The three-layer structure comprises two outer layers 2, 3 and an inner layer 4, the inner layer 4 having a wave-type structure of trapezoidal formations arranged in a row. This inner layer 4 is arranged such that, with respect to the course of its waves, it is arranged parallel to the surfaces of the outer layers 2, 3. In this embodiment, the layers 2, 3, 4 again consist of metal sheets or metal plates, the inner layer 4 having been shaped into a wave structure of trapezoidal formations arranged in a row by stamping such a metal plate. The respective layers 2, 3, 4 are mutually connected by adhesive connections (not shown). This results in an end plate 1 of a stable structure which is extremely suitable for counteracting deformations as a result of pressure changes in the interior of the storage cells of an energy storage module.

Figure 4:
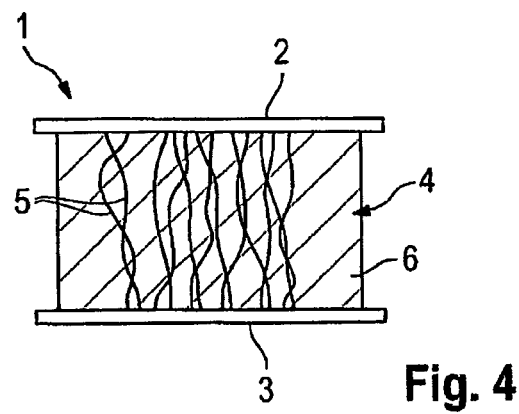
FIG. 4 is a lateral view of an end plate of the energy storage module of the invention according to a fourth embodiment.

FIG. 4 illustrates an end plate 1 for an energy storage module according to a fourth embodiment, which has a three-layer structure. The three-layer structure comprises two outer layers 2, 3 and an inner layer 4, the inner layer 4 having a diffuse and/or wave-type structure. This three-layer structure was obtained by applying a vacuum to the top side and bottom side of a fiber woven, whereby the fiber woven was divided into two outer cover layers 2, 3 and an inner layer 4, the inner layer 4 being formed of fiber webs 5 which connect the two cover layers 2, 3 with one another. A matrix material 6 is placed between the fiber webs 5 for stabilizing and fixing the fiber structure, the matrix material 6 preferably being a duromer, such as an epoxy resin. The matrix material 6 is hardened by light for completing the end plate. This results in an end plate 1 of a stable structure which is extremely suitable for counteracting deformations as a result of pressure changes in the interior of the storage cells of an energy storage module.

Figure 5:
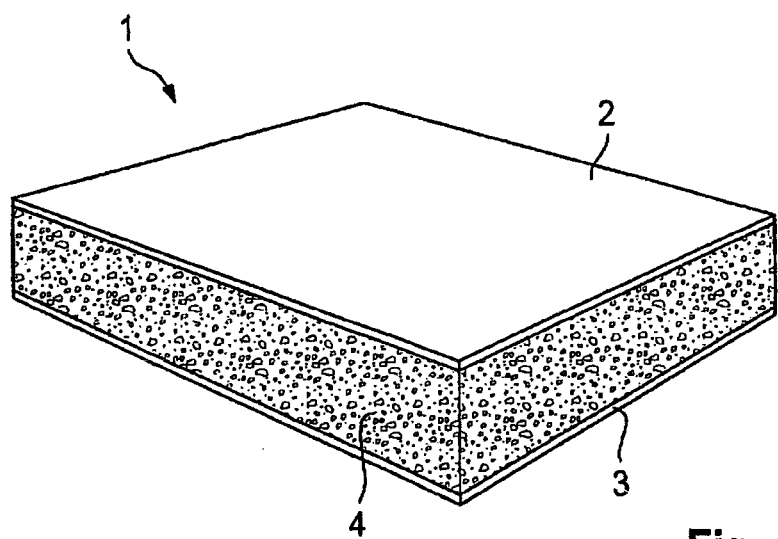
FIG. 5 is a lateral view of an end plate of the energy storage module of the invention according to a fifth embodiment.

FIG. 5 illustrates an end plate 1 for an energy storage module according to a fifth embodiment, which has a three-layer structure. The three-layer structure comprises two outer layers 2, 3 and an inner layer 4, the inner layer 4 having a diffuse and/or wave-type structure. The respective outer layers 2, 3 are formed of metal plates and particularly of aluminum plates. The inner layer 4 is formed of an aluminum foam plate consisting of an aluminum alloy which was foamed by means of a suitable foaming agent, such as titanium hydride (TiH). Because of its pores or cavities, the aluminum foam plate is excellently suitable for absorbing and diverting deformations as a result of pressure changes in the interior of the storage cells of an energy storage module, thus, for example, deformation energies occurring in the case of a vehicle crash. This three-layer structure is particularly distinguished by the use of an aluminum foam plate as the inner layer 4 as well as advantageously by the use of aluminum plates as the respective outer layer 2, 3, by a low net weight, which is particularly advantageous for the use in motor vehicles of a lightweight construction.

LIST OF REFERENCE NUMBERS

1 End plate
2 Outer layer of end plate
3 Outer layer of end plate
4 Inner layer of end plate
5 Fiber webs
6 Matrix material The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage module for a device for supplying voltage of a motor vehicle, the energy storage module comprising:
   a plurality of prismatic storage cells stacked in at least one row and arranged behind one another,
   wherein the at least one row of cells is braced between at least two end plates by way of at least one tension element comprising at least one tie rod,
   wherein at least one of the end plates has a layer structure of three successive layers in which two planar outer layers surround at least one inner layer having at least one of a wavy and a diffuse structure;
   wherein the layer structure is a fiber composite material comprising (i) a semi-finished textile product containing fibers, and (ii) a polymeric matrix,
   wherein the layer structure includes fiber webs of the semi-finished textile product split between both the planar outer layers and the inner layer, and
   wherein the fiber webs contain fibers belonging partly to unpulled fiber material forming at least one of the outer layers.

2. The energy storage module according to claim 1, wherein the fibers are one of glass fibers, carbon fibers, mineral fibers, plant fibers, ceramic fibers, steel fibers and synthetic fibers.

3. The energy storage module according to claim 1, wherein the fibers are in the form of one of a woven, a weave and a knit.

4. The energy storage module according to claim 2, wherein the fibers are in the form of one of a woven, a weave and a knit.

5. A method of producing an end plate for an energy storage module, wherein the end plate has a layer structure of at least three successive layers, wherein two outer layers surround at least one inner layer, and wherein the inner layer has at least one of a wave-type and diffuse structure, wherein the method comprises the acts of:

providing a semi-finished textile product comprised of one of a fiber woven, a fiber weave and a fiber knit, wherein the semi-finished textile product contains glass fibers;

placing a polymeric matrix comprised of one of a thermoplastic and duromeric matrix into the semi-finished textile product;

applying a vacuum to both surface sides of the semi-finished textile product;

pulling the semi-finished textile product into shape; and hardening the end plate.

6. A method of producing an energy storage module for a device for supplying voltage of a motor vehicle, wherein the energy storage module comprises a plurality of prismatic storage cells which, stacked in at least one row, are arranged behind one another, wherein the method comprises the acts of:

providing at least two end plates, wherein at least one end plate has a layer structure of at least three successive layers in which two outer layers surround at least one inner layer, and wherein the inner layer has one of a wave-type and diffuse structure;

providing at least one of fastening elements and floor fastening elements on at least one of the at least end plate and a tie rod;

mounting at least one end plate respectively on the respective face side of the storage cells disposed at the end of the prismatic storage cells stacked in a row; and bracing the end plates by way of at least one tension element comprising at least one tie rod.

7. The method according to claim 6, wherein at least one of the end plates was produced according to the method of claim 5.

* * * * *